United States Patent
Seifert

(10) Patent No.: US 10,421,263 B2
(45) Date of Patent: Sep. 24, 2019

(54) STRUCTURED PACKAGING FILM AND METHOD OF MAKING SAME

(71) Applicant: MONDI AG, Vienna (AT)

(72) Inventor: Ulf Seifert, Ochtrup (DE)

(73) Assignee: MONDI AG, Vienna (AT)

(*) Notice: Subject to any disclaimer, the term of this patent is extended or adjusted under 35 U.S.C. 154(b) by 0 days.

(21) Appl. No.: 15/782,072

(22) Filed: Oct. 12, 2017

(65) Prior Publication Data

US 2018/0111362 A1 Apr. 26, 2018

(30) Foreign Application Priority Data

Oct. 21, 2016 (EP) ..................................... 16195091

(51) Int. Cl.
*B32B 38/14* (2006.01)
*B32B 7/02* (2019.01)
(Continued)

(52) U.S. Cl.
CPC ................ *B32B 38/14* (2013.01); *B32B 3/00* (2013.01); *B32B 7/02* (2013.01); *B32B 7/12* (2013.01); *B32B 15/085* (2013.01); *B32B 15/09* (2013.01); *B32B 37/0046* (2013.01); *B32B 37/02* (2013.01); *B41M 1/10* (2013.01); *B41M 1/30* (2013.01); *B41M 3/00* (2013.01);
(Continued)

(58) Field of Classification Search
CPC ....... B32B 38/14; B32B 7/12; B32B 37/0046; B32B 15/09; B32B 15/085; B32B 37/02; B32B 3/00; B32B 7/02; B32B 2553/00; B32B 2255/10; B32B 2255/26; B41M 1/10; B41M 3/00; B41M 1/30; B41M 7/0027; Y10T 428/24736; Y10T 428/24802; Y10T 428/24479; Y10T 428/24521; Y10T 428/24752; Y10T 428/24355; Y10T 428/24628; Y10T 428/24364
USPC ................................................... 428/142, 141
See application file for complete search history.

(56) References Cited

U.S. PATENT DOCUMENTS 3,459,626 A * 8/1969 Morgan ................. B44C 1/162
428/41.8
4,919,994 A * 4/1990 Incremona ............ B44C 1/1733
428/141
(Continued)

FOREIGN PATENT DOCUMENTS

EP 2347967 B 7/2011
EP 2272647 B 10/2011
JP 04282248 A * 10/1992

OTHER PUBLICATIONS

[NPL-1] Nakagawa (JP H04-282248 A) (JPO—machine translation to English). (Year: 1992).*

Primary Examiner — David Sample
Assistant Examiner — Donald M Flores, Jr.
(74) Attorney, Agent, or Firm — Andrew Wilford

(57) ABSTRACT

A structured packaging film is made by first of feeding a flat, unembossed first film web in a gravure printing device to a cylindrical print roller having an engraving on its surface with an array of cavities having a depth of at least 50 μm. Printing laquer is applied to the print roller to fill the cavities. Then the roller is rolled on the first film web to transfer the laquer to the web to form thereon a printed image in gravure printing. The laquer is dried on the web to have a thickness of at least 30 μm and the printed areas form clearly perceptible structuring.

12 Claims, 4 Drawing Sheets

(51) Int. Cl.
- *B32B 7/12* (2006.01)
- *B32B 15/085* (2006.01)
- *B32B 15/09* (2006.01)
- *B32B 37/00* (2006.01)
- *B32B 37/02* (2006.01)
- *B41M 1/10* (2006.01)
- *B41M 1/30* (2006.01)
- *B41M 3/00* (2006.01)
- *B32B 3/00* (2006.01)
- *B41M 7/00* (2006.01)

(52) U.S. Cl.
CPC ....... *B32B 2255/10* (2013.01); *B32B 2255/26* (2013.01); *B32B 2553/00* (2013.01); *B41M 7/0027* (2013.01); *Y10T 428/24355* (2015.01); *Y10T 428/24479* (2015.01); *Y10T 428/24521* (2015.01); *Y10T 428/24628* (2015.01); *Y10T 428/24736* (2015.01); *Y10T 428/24752* (2015.01); *Y10T 428/24802* (2015.01)

(56) References Cited

U.S. PATENT DOCUMENTS

| | | | | |
|---|---|---|---|---|
| 5,665,446 | A * | 9/1997 | Sundet | B32B 17/10247 428/213 |
| 5,762,379 | A * | 6/1998 | Salmon | B42D 15/00 283/109 |
| 6,161,928 | A * | 12/2000 | Morikawa | B41M 7/00 347/101 |
| 6,376,094 | B1 * | 4/2002 | Dames | B32B 7/12 428/514 |
| 7,632,566 | B2 * | 12/2009 | Koike | B32B 27/32 428/316.6 |
| 2005/0120917 | A1 * | 6/2005 | Ruger | C09C 1/0015 428/403 |
| 2006/0019074 | A1 * | 1/2006 | Scarbrough | B41M 1/18 428/195.1 |

* cited by examiner

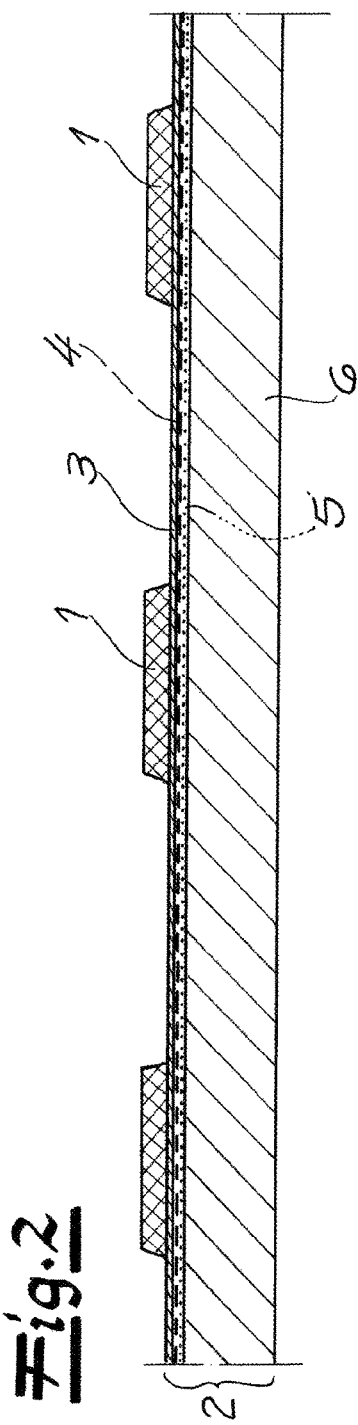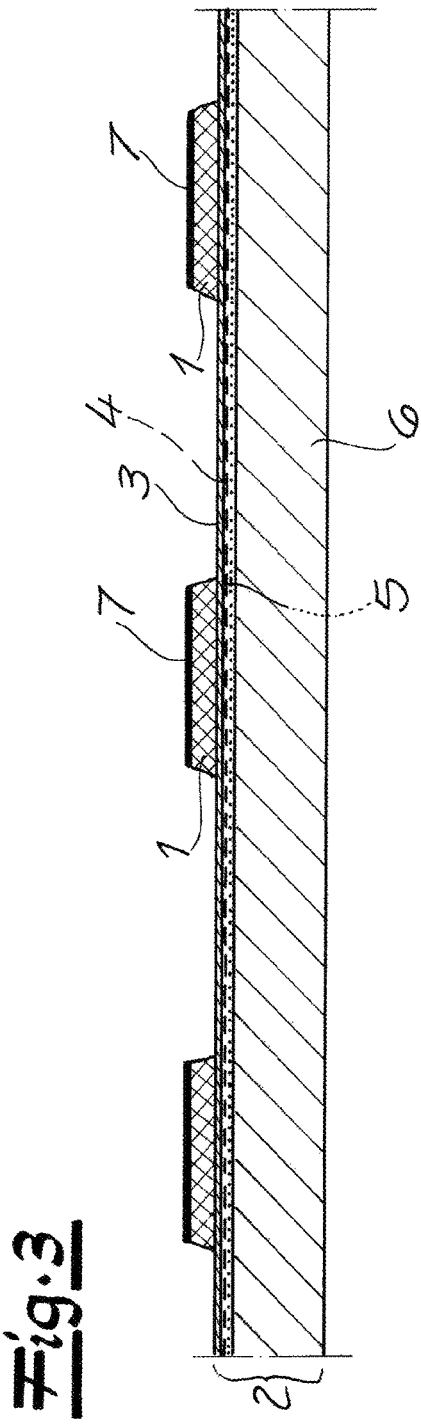

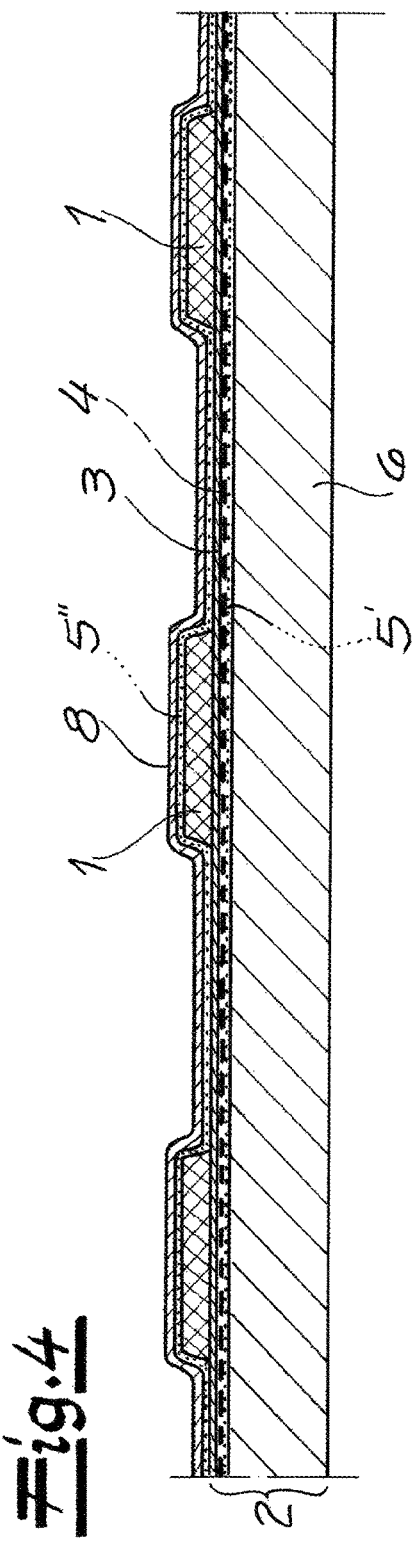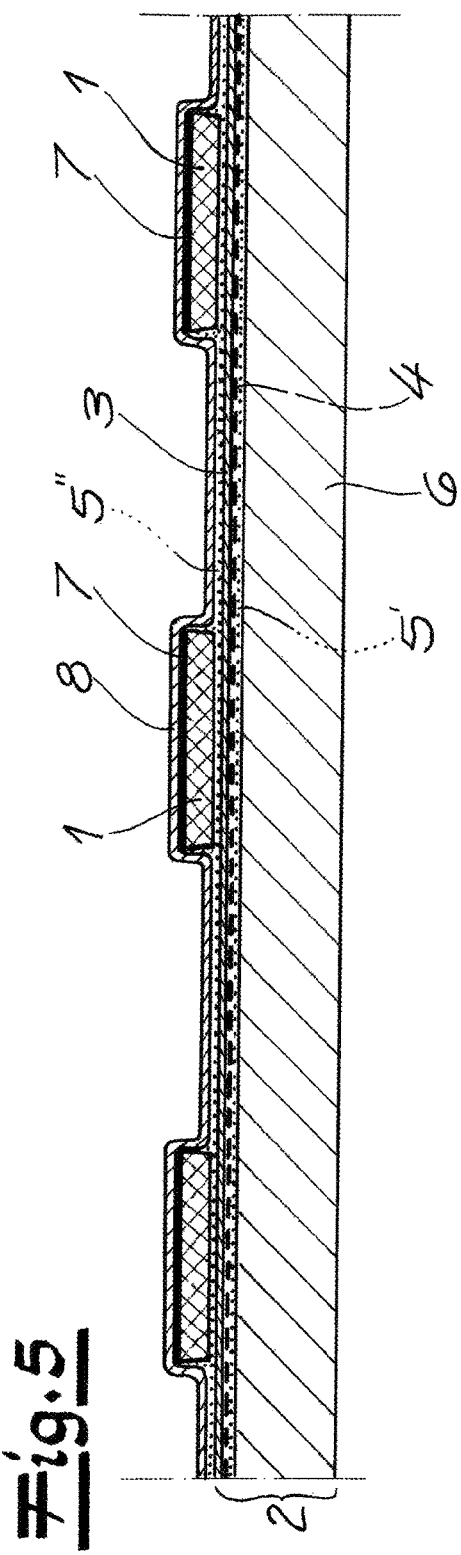

STRUCTURED PACKAGING FILM AND METHOD OF MAKING SAME

FIELD OF THE INVENTION

The present invention relates to a structured packaging film. In addition, this invention concerns a method of making such a film.

BACKGROUND OF THE INVENTION

A so-called structured packaging film is used typically to make a bag, for instance a bag holding a specific product.

Such bags as well as for example tray packaging having a cover film, are generally provided, at least on visible surfaces with indicia for furnishing information to a user and for creating a high-quality appearance with printing. The indicia may indicate what is held in the bag, or merely identify a merchant or even an advertiser In addition, for further improving the appearance it is also known to provide the packaging film, which in itself is planar and flat, with structuring, that is with indicia that are raised above the generally flat surface of the bag. In particular, individual areas may be emphasized via appropriately adapted structuring that does not recur over the entire surface area. For example, individual text fields, images, logos, as well as finer structures such as outlines and letters may be emphasized.

To achieve a high-quality 3D effect in a packaging film, according to EP 2 347 967 it is known to emboss the packaging film, it then being possible to also align the embossed pattern or indicia with a print pattern. For example, raised areas are engaged with an ink roller so that only these areas are inked.

For embossed packaging films, however, there is the disadvantage that the embossing effect becomes reduced over time due to the elastic recovery behavior of the polymer chains. This reduction is accelerated in particular when pressure is exerted on the packaging film, and/or the packaging film is stored at an elevated temperature.

Furthermore, there is also the risk that embossed areas may be easily pressed flat if enough force is applied. It must also be taken into account that embossing, in particular when it is adapted to a specific design or printed image of the bag, is done directly during manufacture of the film, the packaging film then being rolled up for transport and storage. Merely the bearing pressure on a roller may result in a reduction of the embossment.

These disadvantages may be avoided when, according to EP 2 272 647, a packaging film is formed that is still embossable in areas after the extrusion process. However, the subsequent activation of such a packaging film is relatively complicated, and in addition high manufacturing costs result due to the incorporation of foamable particles. It is also disadvantageous that in principle the entire surface area of the packaging film is available for embossing, but ultimately only small areas are actually embossed.

OBJECTS OF THE INVENTION

It is therefore an object of the present invention to provide an improved structured packaging film and method of making same.

Another object is the provision of such an improved structured packaging film and method of making same that overcomes the above-given disadvantages, in particular a method of making a structured packaging film that may be easily carried out to produce structuring that is of particularly high-quality and long-lasting.

Yet another object is to provide a corresponding packaging film.

SUMMARY OF THE INVENTION

A structured packaging film is made according to the invention by first of feeding a flat, unembossed first film web in a gravure printing device to a cylindrical print roller having an engraving on its surface with an array of cavities having a depth of at least 50 µm. Printing laquer is applied to the print roller to fill the cavities. Then the roller is rolled on the first film web to transfer the laquer to the web to form thereon a printed image in gravure printing. The laquer is dried on the web to have a thickness of at least 30 µm and the printed areas form clearly perceptible structuring.

In contrast to a customary printing process that is provided for a packaging film, due to the application of the printing lacquer a material application that is also perceptible to a user takes place, resulting in structuring of the formed packaging film.

The cavities that form the print raster preferably have a cavity depth between 80 µm and 180 µm, for example 130 µm, so that the printing lacquer may be applied in a sufficient quantity to the film web.

In this regard, it must be taken into account that the cavity depth does not exactly correspond to the layer thickness of the printing lacquer for the finished packaging film. After the printing lacquer is transferred from the cylindrical print roller to the first film web in the gravure printing process, the printing lacquer is still able change its shape with respect to the inner contour of the cavities, and in particular is still able to flow to a certain extent. In addition, the drying of the printing lacquer is also associated with a reduction in the layer thickness. However, the printing lacquer is selected, and applied to the first film web, in such a way that the printing lacquer has a layer thickness of at least 30 µm after drying. Distinct transitions are then perceivable on the printed image due to the layer thickness in question.

Due to the application of the printing lacquer, the packaging film may also be easily rolled up in multiple layers and stored before further processing. In addition, compression of the packaging film does not result in impairment of the structuring.

According to a first variant of the invention, the face of the first film web provided with the printed image also forms an outer face of the packaging film, the printed image then being either exposed, or covered by further, only thin, print layers and protective layers. For example, if a colored layer or a protective lacquer is applied in the liquid state, these layers may adapt to the structured shape of the printed image, so that the desired 3D effect also is not, or at least not essentially, impaired. If at least one colored layer or a protective lacquer is applied in the subsequent printing or coating steps, the total thickness of such a coating is typically less than 10 µm.

The layer thickness of at least one colored layer that is applied in an additional printing step is typically less than 5 µm, for example between 1 µm and 5 µm.

Such an additional colored layer, or also multiple colored layers in multicolor printing, are generally applied in a predefined relation to the printed image of the printing lacquer. A colored layer may, for example, be applied in alignment with the printing lacquer, so that the areas provided with the colored layer are then emphasized. Depending on requirements, however, the areas that are not printed by the printing lacquer may also be provided with a colored layer; of course, arbitrary combinations are possible. For example, the printing lacquer may also be used to provide special emphasis on individual lines or sections in a graphical illustration.

In this regard, it should be noted that within the scope of the invention, the printing lacquer may be colored, clear, or also opaque, independently of the further embodiment of the packaging film. When the printing lacquer is colored, for this reason alone a corresponding color impression results, based on the printed image, and additional colors may then be applied in a small layer thickness in a conventional manner. In contrast, when the printing lacquer is clear or opaque, formation of the desired structuring is the sole priority.

According to one alternative embodiment of the method, the first film web on its face that is provided with the printed image of the printing lacquer is laminated with a second film web in order to form a composite film web. The printing lacquer is then, with interior protection, between the first film web and the second film web.

The first film web and the second film web may be laminated together with adhesive. Preferably the adhesive is applied over the entire surface area to the first film web on the face of the printed image or on the adjoining face of the second film web. Application of adhesive over the entire surface area is advantageous in order to achieve a secure connection despite the differences in thickness at the transitions of the printed and unprinted areas.

In the cured, i.e. dry, state, the adhesive may typically be present with a weight per unit area between 2 $g/m^2$ and 8 $g/m^2$, in particular between 4 $g/m^2$ and 6 $g/m^2$.

The subject matter of the invention further relates to a packaging film that is obtainable from the above-described method. Against this background, preferred features of the method also result from the following description of the packaging film. Accordingly, the following discussion also serves to further specify the method according to the invention.

The packaging film has an outer film, a support laminate, and a printed image, with printed and unprinted areas, situated between the outer film and the support laminate. The outer film forms a first outer face of the packaging film. The outer film has a thickness of less than 30 µm, and the printing lacquer in the printed areas has a layer thickness of greater than 30 µm, wherein the printing lacquer directly adjoins the outer film or, via at least one intermediate layer, is at a spacing of less than 15 µm from the outer film, so that the areas that are printed with the printing lacquer and the unprinted areas form structuring through the outer film, on the first outer face formed by the outer film.

According to the invention, despite the printing lacquer being covered, the structuring thus formed may still stand out on the first outer face, which is achieved by the considerable layer thickness of the printing lacquer on the one hand and the small thickness of the outer film on the other hand. In particular, the thickness of the outer film is less than the thickness of the printing lacquer on the packaging film, i.e. in the dry state of the printing lacquer.

With regard to the above-described method, the outer film may be formed by either the first film web or the second film web. Thus, with the described covered arrangement of the printing lacquer, in reverse printing the outer film as well as the support laminate as the first film web may be printed during the manufacture.

To achieve a layer thickness of at least 30 µm with the printing lacquer in the dry state at preferably low cost, according to one preferred embodiment of the invention the printing lacquer contains comparatively large particles. In particular, particles having an average particle diameter greater than 25 µm, for example between 30 µm and 40 µm, may be provided. According to the general definitions, the average particle diameter refers to a determination based on an equivalent spherical diameter, thus taking into account a shape of the particles that differs from the spherical shape. In particular inorganic nonmetallic particles such as silicon dioxide are suitable.

According to one preferred embodiment of the invention, the material of the outer film is selected from the group comprising oriented polyethylene terephthalate (O-PET), oriented polypropylene (O-PP), oriented polylactic acid (O-PLA), oriented polyamide (O-PA), and cellulose. In this regard, oriented film material is preferably biaxially oriented. In addition to one embodiment as monofilm, multilayer outer films are also suitable. The thickness of the outer film is particularly preferably less than 20 µm.

With oriented polyethylene terephthalate (O-PET) as the preferred material, particularly small thicknesses of 12 µm, for example, may be provided. Within the scope of the invention, a small layer thickness is crucial for the contour of the printed image of the printing lacquer situated underneath to be able to stand out well on the first outer face.

The support laminate typically has a thickness between 20 µm and 150 µm, in particular between 40 µm and 120 µm. A weldable layer is advantageously provided on a face opposite from the outer film, which forms a second outer face of the packaging film, so that the packaging film may be easily formed into a film packaging bag, for example, by thermal welding. In particular polyolefins such as polyethylene and polypropylene, including the respective copolymers, are suited as heat-sealable material.

The support laminate may also be coextruded or laminated in multiple layers. For example, a weldable layer may be laminated onto a polyolefin, in particular polyethylene, with a metallized layer made of oriented polyethylene terephthalate.

The printing lacquer is preferably formed on the basis of cellulose nitrate or cellulose dinitrate. Such an embodiment of the lacquer results in the advantage that the lacquer may then be easily processed in the gravure printing process, a desired viscosity also being predetermined.

BRIEF DESCRIPTION OF THE DRAWING

The above and other objects, features, and advantages will become more readily apparent from the following description, reference being made to the accompanying drawing in which:

FIGS. 2 to 5 are large-scale sections through various structured films according to the invention.

SPECIFIC DESCRIPTION OF THE INVENTION

Figure 1:
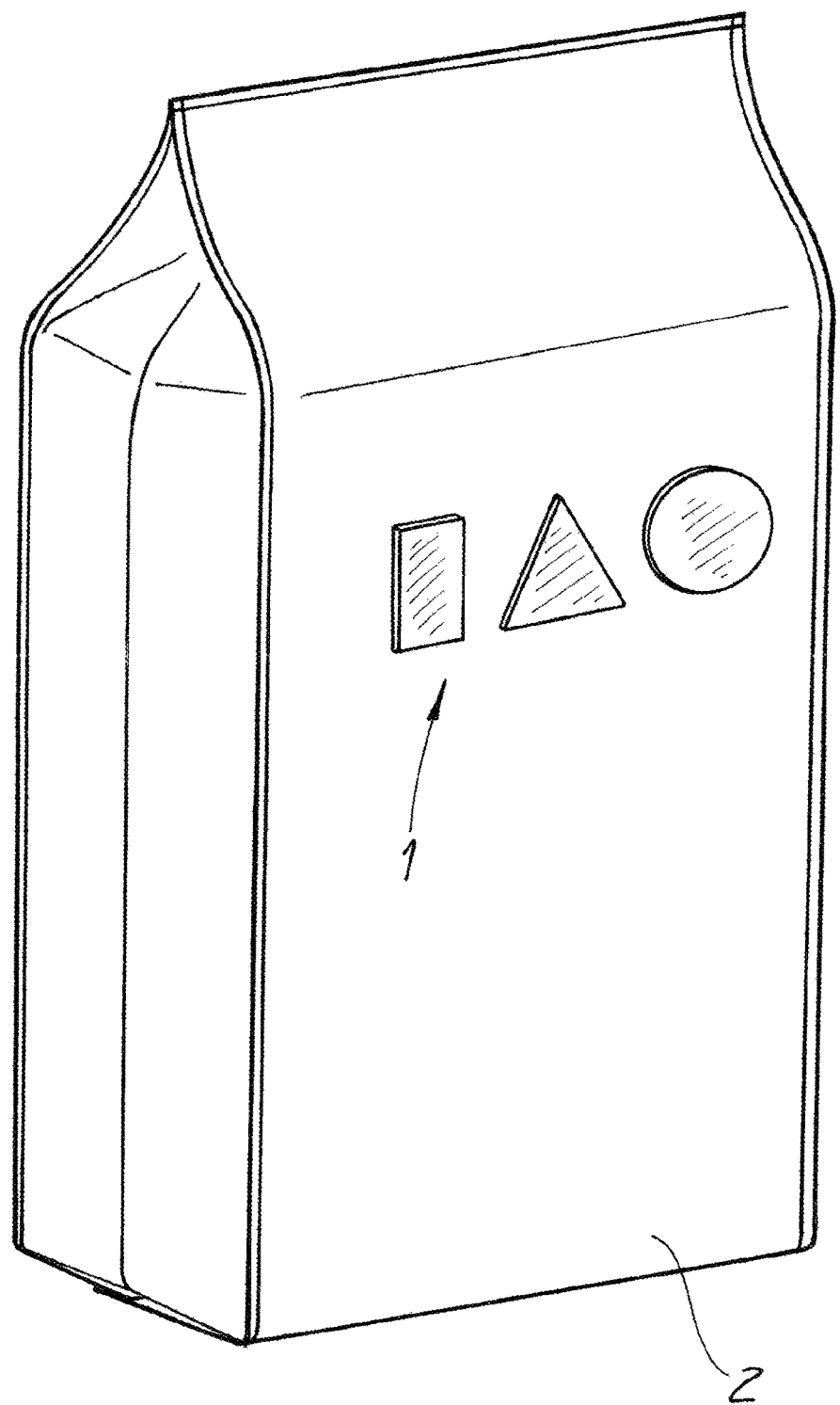
FIG. 1 shows a packaging bag formed from a packaging film according to the invention.

As seen in FIG. 1 a film packaging bag 2 is formed from a packaging film according to the invention. It carries raised indicia 1 that stand out from the front face of the bag 2.

As explained in greater detail below, the film packaging bag has structuring that is formed by a printing lacquer 1, the printing lacquer 1 being provided in a printed image made up of printed and unprinted areas.

According to one possible embodiment of the packaging film according to the invention of FIG. 2, the printing lacquer 1 is applied to a support laminate 2 in areas. The support laminate together with the printing lacquer 1 form the overall packaging film. The support laminate 2 has multiple layers, and in the illustrated embodiment has a layer 3 of oriented polyethylene terephthalate provided on an inner face with a metal layer 4 and is joined via laminating adhesive 5' to a weldable layer 6 of polyethylene on the face provided with the metal layer 4. Thus the metal layer is between the layer 3 of oriented PE and the PE layer 6.

According to the invention, when the printing lacquer 1 on the support laminate 2 is dry it has a thickness of at least 30 μm, for example between 35 μm and 40 μm. Due solely to the printing lacquer 1, this results in 3D structuring that is also clearly perceivable to a user. When the printing lacquer 1 itself is colored, a color pattern results that matches the spatial structure.

The provision of the printing lacquer 1 on a surface of the packaging film is also referred to in practice as "recto printing."

In one embodiment that in other respects is the same, FIG. 3 shows a refinement in which only a thin colored layer 7 is provided on an outer face of the printing lacquer 1. The thickness of the colored layer 7 in the dry state, i.e. in the packaging film as a finished product, is less than 5 μm, for example between 1 μm and 5 μm.

FIG. 3 shows strictly by way of example that the colored layer 7 is in precise alignment with the printed image of the printing lacquer 1. Such an arrangement is advantageous in particular when the printing lacquer 1 itself is not colored.

If the printing lacquer 1 is transparent or at least translucent, the colored layer 7 may also be applied before the printing lacquer 1, so that the colored layer 7 is then under the printing lacquer 1 or between the inner face thereof and the outer face of adhesive layer 5'.

The illustration of the colored layer 7 in precise alignment with the printing lacquer 1 is by way of example only. In such an embodiment, the colored layer 7 assists in the structuring that is predefined by the printed image of the printing lacquer 1. Of course, the colored layer 7 may also be provided in the areas that are not printed with printing lacquer 1, in which case the colored layer 7 is to be applied before the printing lacquer 1. In addition, in multicolor printing, multiple colored layers may also be applied before or after the printing lacquer 1.

In the embodiment according to FIGS. 2 and 3, the printing lacquer 1 and the colored layer 7 situated thereon lie on an outer face of the packaging film. To avoid abrasion, a the entire outer face may be coated with a protective lacquer. When such a protective lacquer is applied as a liquid state over the entire surface area, the protective lacquer conforms to the structuring that is predefined by the printing lacquer 1, so that the 3D structure is essentially maintained. In addition, a protective lacquer is very thin, having a layer thickness of less than 5 μm, for example.

FIG. 4 shows one preferred embodiment of the invention, with the printed image of the printing lacquer 1 covered by an outer film 8 that may be applied as a liquid curable to form a flexible coating.

The thickness of the outer film 8 is less than the layer thickness of the printing lacquer 1, so that the outer film 8 conforms well to the contour of the printing lacquer 1, and the structuring is also visible through the outer film 8. The outer film 8 and the support laminate 2 may be glued together with laminating adhesive 5", the laminating adhesive 5 preferably being provided over the entire surface area, with a weight per unit area between 4 g/m² and 6 g/m² (based on the dry state).

The thickness of the outer film 8 is preferably less than 20 μm. For example, an outer film 8 made of oriented polyethylene terephthalate (O-PET), having a thickness of only 12 μm, for example, is particularly suitable. In addition, the layer 3 made of oriented polyethylene terephthalate, which in this embodiment is provided with the metal layer 4 strictly by way of example, may have a thickness of 12 μm. The thickness of the weldable layer 6 may be 100 μm, for example.

As explained in conjunction with FIG. 3, in the embodiment according to FIG. 4 at least one additional colored layer 7 may also be provided. This additional colored layer together with the printing lacquer 1 is generally also formed, covered, between the support laminate 2 and the outer film 8; with regard to the different embodiment options, reference is made to the discussion for FIG. 3.

Within the scope of this embodiments, the terms "outer film 8" and "support laminate 2" refer to the arrangement of the packaging film in a film packaging as illustrated in FIG. 1. The outer film 8 hereby forms a generally transparent outer face of the film packaging, while the printing lacquer 1 and at least one additional colored layer 7 are then situated in a protected manner. For bag packaging, the support laminate 2 is situated in the interior; seams of the film packaging may be easily formed by thermal welding due to the weldable layer 6.

In the present context, the term "support laminate 2" does not refer to the printing of the printing lacquer 1.

FIG. 5 shows one embodiment in which a colored layer 7 and the printing lacquer 1 are applied to the inner face of the outer film 8, the outer film 8 with the corresponding face then being laminated to the support laminate 2, which in other respects is as described above, using laminating adhesive 5.

Figure 6:
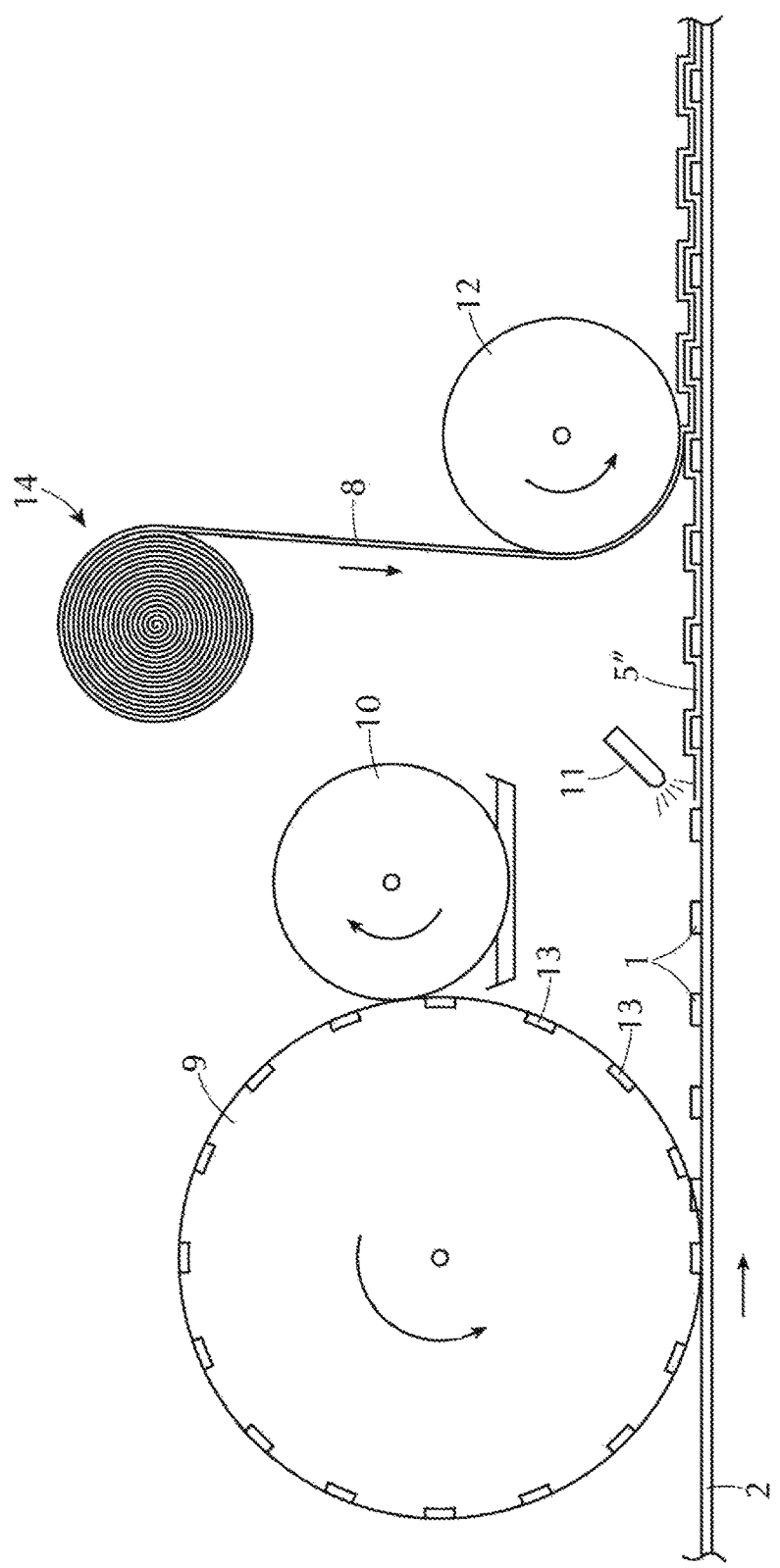
FIG. 6 is a schematic drawing illustrating the method of this invention.

FIG. 6 shows how the raised printing lacquer is applied as the indicia 1 to the laminate 2 by a roller 9 supplied with the lacquer from an inking roller 10. Then a thin adhesive layer 5" is sprayed from a nozzle 11 over the laminate 2 carrying the raised lacquer indicia 1. Subsequently the thin and transparent cover layer 8 is applied over the adhesive 5" with the help of a roller 13 pulling the layer 8 from a supply 14. The roller 9 is formed with an array of cavities 13 shaped to form the desired raised indicia 1 and having a depth of at most 50 μm.

I claim:

1. A packaging film comprising:
    an outer film having a thickness of less than 30 μm and forming a first outer face;
    a support laminate; and
    a printed image between the outer film and the support laminate and comprised of printed and unprinted areas, the printed area formed of a printing lacquer having in the printed areas a layer thickness of greater than 30 μm, the printing lacquer directly juxtaposed with the outer film or at a spacing of less than 15 pin from the outer film, the areas of printing lacquer and the unprinted areas forming structuring through the outer film on the first outer face of the outer film, the printing lacquer containing inorganic nonmetallic particles having an average particle diameter greater than 25 μm.

2. The film defined in claim 1, further comprising:
    a colored layer having a layer thickness of less than 5 μm and overlying in at least partial alignment the printing lacquer.

3. The film defined in claim 1, further comprising an adhesive layer that extends over an entire inner surface area of the outer film such that, after solidifying of the adhesive layer, the adhesive layer is present with a weight per unit area between 2 g/m² and 8 g/m².

4. The packaging film defined in claim 1, wherein the outer film is formed from a material selected from the group comprising oriented polyethylene terephthalate (O-PET), oriented polypropylene (O-polypropylene), oriented polylactic acid (O-PLA), oriented polyamide (O-PA), and cellulose.

5. The packaging film defined in claim 1, wherein the printing lacquer is colored.

6. The packaging film defined in claim 5, wherein the printing lacquer contains cellulose nitrate.

7. A packaging film comprising:
an outer film having a thickness of less than 30 µm and forming a first outer face;
a support laminate having a thickness between 20 µm and 150 µm and a weldable layer on a second outer face opposite the outer film; and
a printed image between the outer film and the support laminate and comprised of printed and unprinted areas, the printed area formed of a printing lacquer having in the printed areas a layer thickness of greater than 30 µm, the printing lacquer directly juxtaposed with the outer film or at a spacing of less than 15 µm from the outer film, the areas of printing lacquer and the unprinted areas forming structuring through the outer film on the first outer face of the outer film.

8. The film defined in claim 7, further comprising:
a colored layer having a layer thickness of less than 5 µm and overlying in at least partial alignment the printing lacquer.

9. The packaging film defined in claim 7, wherein the outer film is formed from a material selected from the group comprising oriented polyethylene terephthalate (O-PET), oriented polypropylene (O-POLYPROPYLENE), oriented polylactic acid (O-PLA), oriented polyamide (O-PA), and cellulose.

10. The film defined in claim 7, further comprising an adhesive layer that extends over an entire inner surface area of the outer film such that, after solidifying of the adhesive layer, the adhesive layer is present with a weight per unit area between 2 g/m² and 8 g/m².

11. The packaging film defined in claim 7, wherein the printing lacquer is colored.

12. The packaging film defined in claim 11, wherein the printing lacquer contains cellulose nitrate.

\* \* \* \* \*